United States Patent
Flannigan et al.

(10) Patent No.: US 7,650,884 B2
(45) Date of Patent: Jan. 26, 2010

(54) RESPIRATORY FACEPIECE AND METHOD OF MAKING A FACEPIECE USING SEPARATE MOLDS

(75) Inventors: Paul J. Flannigan, Roseville, MN (US); Steven J. Maxa, Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 598 days.

(21) Appl. No.: 10/719,959

(22) Filed: Nov. 21, 2003

(65) Prior Publication Data

US 2005/0109343 A1    May 26, 2005

(51) Int. Cl.
*A62B 18/08*   (2006.01)
(52) U.S. Cl. .............. 128/206.12; 128/205.25; 128/205.27; 128/205.29; 128/206.15; 128/206.16; 128/206.17; 128/206.18; 128/206.27; 128/206.28; 128/207.11
(58) Field of Classification Search ............ 128/205.25, 128/205.27, 206.15, 206.16, 206.17, 207.11, 128/206.18, 206.27, 206.28
See application file for complete search history.

(56) References Cited

U.S. PATENT DOCUMENTS

| | | | |
|---|---|---|---|
| 3,786,126 A | 1/1974 | Reimschussel et al. | |
| 3,873,288 A | 3/1975 | Wachter et al. | |
| 5,019,140 A | 5/1991 | Bowser et al. | |
| 5,062,421 A | 11/1991 | Burns et al. | |
| 5,394,568 A | 3/1995 | Brostrom et al. | |
| 5,481,763 A | 1/1996 | Brostrom et al. | |
| 5,505,197 A * | 4/1996 | Scholey ............ | 128/206.17 |
| 5,592,935 A | 1/1997 | Elstran et al. | |
| 5,592,937 A * | 1/1997 | Freund ............. | 128/206.16 |
| 5,720,280 A | 2/1998 | Elstran et al. | |
| 5,924,420 A | 7/1999 | Reischel et al. | |
| 6,016,804 A * | 1/2000 | Gleason et al. ...... | 128/206.17 |
| 6,102,039 A | 8/2000 | Springett et al. | |
| 6,234,171 B1 | 5/2001 | Springett et al. | |
| 6,298,849 B1 * | 10/2001 | Scholey et al. ....... | 128/205.27 |
| 6,497,232 B2 * | 12/2002 | Fecteau et al. ....... | 128/207.11 |
| 6,701,925 B1 * | 3/2004 | Resnick ............. | 128/206.17 |
| 2002/0078953 A1 | 6/2002 | Fecteau et al. | |

FOREIGN PATENT DOCUMENTS

| | | |
|---|---|---|
| WO | WO 87/01950 | 4/1987 |
| WO | WO 99/21618 | 7/1999 |
| WO | WO 02/11804 A2 | 2/2002 |
| WO | WO 02/092170 | 11/2002 |

* cited by examiner

*Primary Examiner*—Patricia Bianco
*Assistant Examiner*—Nihir Patel
(74) *Attorney, Agent, or Firm*—Karl G. Hanson

(57) ABSTRACT

A facepiece insert (16) that has a fluid communication component (30, 32) non-integrally joined to a supporting portion (34). The insert can be made by (a) providing at least one supporting portion (34) of a facepiece insert (16); (b) providing at least one fluid communication component (30, 32) separately from the supporting portion (34) of the facepiece insert (16); and (c) securing the at least one fluid communication component (30, 32) to the at least one supporting portion (34).

26 Claims, 2 Drawing Sheets

RESPIRATORY FACEPIECE AND METHOD OF MAKING A FACEPIECE USING SEPARATE MOLDS

The present invention pertains to a method of making a facepiece insert where the fluid communication components and the portion of the insert that carries those components are separately manufactured and are subsequently secured together to form the insert. A compliant face-contacting member also can be secured to the insert to provide a respiratory mask body that would fit snugly over a person's nose and mouth.

BACKGROUND

Many respirators that are sold today use a thin rigid structural part for attaching filter elements and valves to the mask body. These rigid structural parts are commonly produced through injection molding and are often referred to as a "nosepiece" or "rigid insert". A soft compliant material, which conforms to a person's face, is disposed on or about the rigid structural insert to enable the mask to fit snugly over the wearer's nose and mouth. The use of a rigid insert in conjunction with a soft compliant portion tends to make the mask lighter and more comfortable to wear, particularly when compared to previous masks that had used thick rubber throughout essentially the whole mask body to support the filter cartridges and valves. Examples of masks that use a rigid insert in conjunction with a compliant face-contacting member are shown in U.S. Pat. No. 6,016,804 to Gleason et al., U.S. Pat. No. 5,592,937 to Freund, and U.S. Pat. No. 5,062,421 to Burns et al.

The rigid structural components that are employed in mask facepieces regularly incorporate multiple integrated elements that have distinct dimensional tolerance requirements and complex shapes that are customarily formed in molds at relatively great expense.

The control of dimensional tolerance—including actual dimension and conformation of an injected molded part—can be affected by the material used, the cycle time of the part, the mold configuration, and the part design. For a given material and a given part design, the factor that limits production typically is related to the element that has the greatest tolerance requirement. Higher tolerance parts, more-often-than-not, require additional oversight and technical expertise to correctly manufacture.

To properly utilize the efficiency and accuracy of injection-molding technology, designers have sought to encompass as much detail as possible in the molded part so that the whole rigid structural insert can be manufactured in one step. The result therefore often involves complex tooling that is difficult to maintain and operate, especially when used in remote facilities that do not have access to well-trained technical resources. Thus, the higher tolerance requirements for certain portions of the rigid inserts can limit both the design and the production of the whole insert when made using conventional, single-stage, injection-molded technologies. Additionally, when a change to a feature in the facepiece insert is needed, such as a different filter mount, a whole new mold must be provided to make the change. That is, a separate mold must be furnished for the whole nosepiece and not simply for a portion of it.

SUMMARY OF THE INVENTION

The present invention provides a new method of making a facepiece insert, which method comprises: (a) providing a supporting portion of a facepiece insert; (b) providing a fluid communication component separately from the supporting portion; and (c) securing the fluid communication component to the supporting portion to form the facepiece insert.

The invention also provides a new method of making a respiratory mask body by securing a compliant face-contacting member to the facepiece insert so produced.

The present invention further provides a new facepiece insert that comprises:

(a) a supporting portion of a facepiece insert; and (b) a fluid communication component that is non-integrally joined to the supporting portion.

In the present invention, the fluid communication components—which commonly are critical tolerance components because they include more complicated and intricate filter attachment mounts and valve seats—are provided in a first step, and, in another step, a supporting portion of a facepiece insert is joined to the fluid communication component. The facepiece insert and its fluid communication components may be made using, for example, injection molding procedures that are carried out as separate operations. The multi-stage operation may address the tolerance mismatch between the insert components. Because the supporting part(s) and the fluid communication part(s) of the insert are separately provided, the inventive method can also support a beneficial distributed manufacturing scheme where fluid communication components can be produced in one location, with the associated expertise and equipment, and the final insert assembly can be carried out in a second location, where the expertise and associated equipment are lacking. And if a change to the fluid communication component is needed, for example, to allow for a different type of filter attachment, the whole facepiece insert does not need to be reconfigured in the mold. A separate mold need only be provided for the fluid communication component of the facepiece insert.

These and other advantages of the invention are more fully shown and described in the drawings and detailed description of this invention, where like reference numerals are used to represent similar parts. It is to be understood, however, that the drawings and description are for illustration purposes only and should not be read in a manner that unduly limit the scope of this invention.

GLOSSARY

In this document, the terms set forth below have the definitions that follow:

"compliant face contacting member" means the portion of a mask body that engages the facepiece insert directly or otherwise and is compliantly fashioned for making contact with a person's face to allow the mask body to be comfortably supported over a person's nose and mouth.

"critical tolerance component" means a part that has a dimensional tolerance of 0.15 millimeters (mm) or less;

"exterior gas space" means the ambient atmospheric gas space that surrounds a mask body when worn on a person and that ultimately receives exhaled gas after it exits the interior gas space of a mask;

"facepiece insert" means a rigid element(s) that is not a lens of a respiratory mask and is fashioned to form part of the mask body but is made separate from the compliant face contacting member to provide structural integrity to the mask body to allow filtration elements and/or valves to be adequately secured thereto;

"fluid communication component" means an element that is not part of a filter cartridge and that is structured to allow a fluid to pass from an interior gas space to an exterior gas space or vice versa;

"harness" means an element or combination of elements or parts, which elements or combination, allows a mask body to be supported at least over a wearer's nose and mouth;

"interior gas space" means the space that exists between a mask body and a person's face when the mask is being worn;

"mask body" means a structure that can fit over the nose and mouth of a person and that can help define an interior gas space separated from an exterior gas space;

"non-integral" means the parts are made separately before being joined together;

"supporting portion" means the portion of a facepiece insert that would, or in finished form does, directly attach to and support a fluid communication component; and "tolerance" means the permissible deviation from a specified value of a structural dimension.

DETAILED DESCRIPTION OF PREFERRED EMBODIMENTS

In describing preferred embodiments of the invention, specific terminology is used for the sake of clarity. The invention, however, is not intended to be limited to the specific terms so selected, and it is to be understood that each term so selected includes all technical equivalents that operate similarly.

In the practice of this invention, a new method of making a facepiece for a respiratory mask is provided, which method can enable the mask to be expeditiously and reliably manufactured in locations where technically-skilled resources are lacking. The manufacture of fluid communication component (s), which typically have much higher tolerance requirements than the main or supporting portion of the insert, can be performed with relatively simple, robust tooling, allowing the whole mask to be competently assembled at a location where technically skilled resources may not be regularly present.

Figure 1:
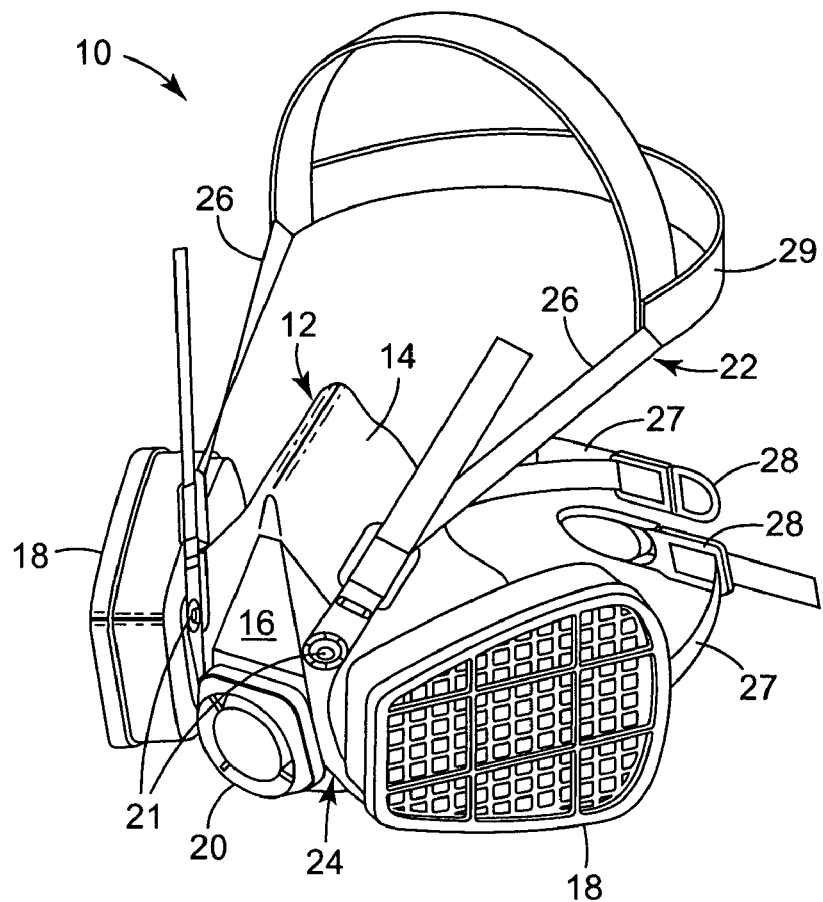
FIG. 1 is a perspective view of a respiratory mask 10.

FIG. 1 shows a respiratory mask 10 that has a mask body 12 that has a compliant face contacting member 14 secured thereabout to enable the mask 10 to be comfortably placed over a person's nose and mouth. The face contacting member 14 may have an inturned feathered cuff so that the mask can fit comfortably and snugly over the wearer's nose and against the wearer's cheeks. A rigid facepiece insert 16 is disposed centrally in the mask body 12 to provide structural integrity to the mask so that it can properly support filter cartridges 18, which are located on opposing sides of the mask body 12. Located centrally on the mask 10 is a exhalation valve that allows exhaled air to be displaced from the mask interior during each exhalation. The insert 16 has a central nose aperture into which the exhalation valve is fitted. For protection, a cap 20 is provided over the exhalation valve.

As shown in FIG. 1, a harness 22 is attached to the mask body 12 to allow the mask body 12 to be supported over a wearer's face. The harness 22 may include a yolk 24 that is secured to the mask body 12 at the cap 20 and at locations 21. Adjustable straps 26 may be joined to the yolk 24 on opposing sides of the central cap 20. Another set of straps 27 may be joined to the mask body 12 for extending behind the neck of the wearer. Straps 27 may likewise be adjustable and may include mating buckle parts 28. A crown member 29 may be employed on the harness to enable the harness 22 to be comfortably supported over the back of a person's head.

Figure 2:
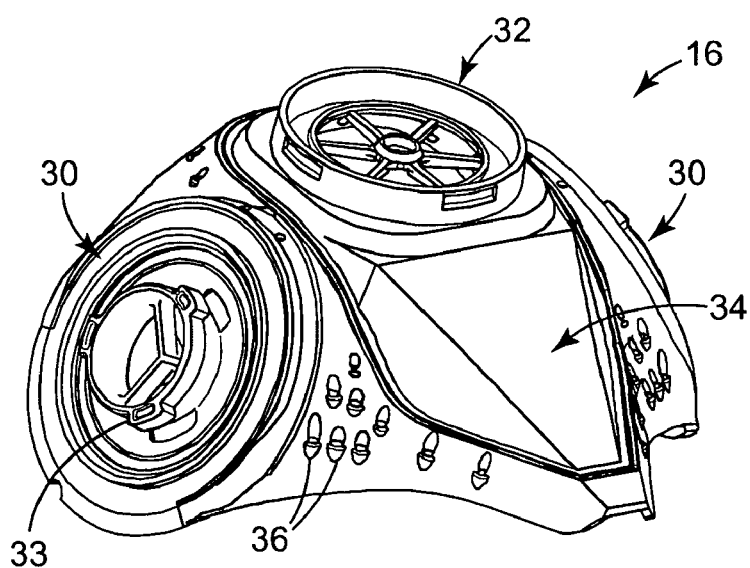
FIG. 2 is a perspective view of a facepiece insert 16.

FIG. 2 shows, in greater detail, the facepiece insert 16 and fluid communication components 30 and 32. The fluid communication components 30 and 32 allow inhaled and exhaled air to be drawn into and removed from the mask interior, respectively. The fluid communication components 30 and 32 have more detail and are generally subjected to greater tolerance requirements than the main supporting portion 34 of the facepiece insert 12. All or part of the fluid communication component may be a critical tolerance component. For purposes of this invention, if at least one element in the fluid communication component is a critical tolerance component, then the whole fluid communication component is considered to be a critical tolerance component.

As shown in FIG. 2, fluid communication component 30 has a bayonet structure 33 that enables a filter cartridge 18 (FIG. 1) or a supplied air source (not shown) to be attached to the facepiece insert 16. Filter cartridge 18 (FIG. 1) may be secured to the bayonet structure 33 by placing its corresponding mating structure over bayonet structure 33 and rotating the filter cartridge 18 relative to the structure 33. The filter cartridge may be removed from the mask body by rotating it in the opposite direction. A removable filter cartridge can be beneficial in that it allows the mask body to be reused when the filter cartridge has met the end of its service life. Alternatively, the filter cartridge can be permanently attached to ensure that the cartridge never comes loose. See U.S. Pat. No. 5,062,421 to Burns and Reischel. The fluid intake communication component 30 may comprise part or all of an inhalation valve (or provide a location suitable for attaching such a valve). Fluid communication component 30 allows air to be drawn into the interior gas space through an orifice during an inhalation but prohibits air from passing from the mask interior into the filter cartridge via the orifice in the fluid communication component 30. The fluid communication component 32 may comprise part or all of an exhalation valve that enables exhaled air to be released from the interior gas space through an orifice during each exhalation or it may provide a location suitable for attaching an exhalation valve. Exhaled air that is purged from the interior gas space through the exhalation valve enters the exterior gas space, thus making the mask more comfortable to wear. Fluid communication components 30 and 32 include a series of spokes that support a central hub to which a valve flap or diaphragm may be attached to create a button-style valve. Alternatively, flapper or cantilevered valves could be used, particularly as exhalation valves for purging exhaled air from the mask interior. Examples of exhalation valves that may be suitable for use on a mask body of the invention include the valves that are disclosed in U.S. Pat. Nos. RE 37,974, 6,584,974, 5,509,436, and 5,325,892, and in U.S. Patent Publication 2002/0195109. Although the facepiece insert is shown in the drawings as being a single, albeit non-integral part, the present invention contemplates a facepiece insert that is comprised of multiple separate parts— see, for example, U.S. Pat. No. 5,592,937 to Freund. The compliant face contacting member could conceivably comprise one or more separate parts as well.

Figure 3:
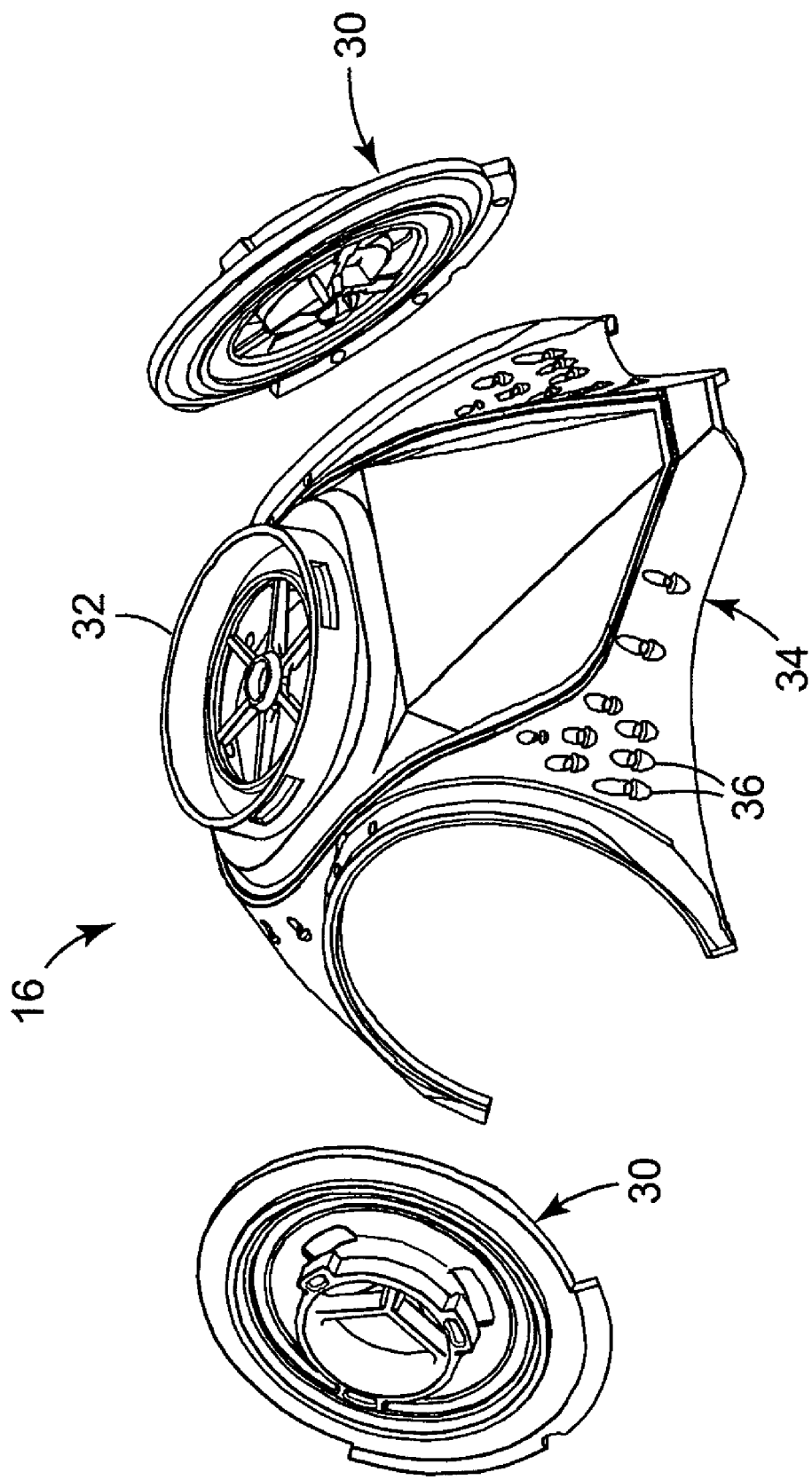
FIG. 3 is a perspective of a facepiece insert 16, showing the fluid communication components 30 separate from the supporting portion 34 of the insert 16.

FIG. 3 shows the fluid communication components 30 separate from the supporting portion 34 of the facepiece insert 16. These fluid intake components 30 may be manufactured at a location or mold separate from the supporting portion 34 of the facepiece insert 16. The fluid exhale component 32 could likewise be made separate from the supporting portion 34 of the insert 16. In the present invention, a separate mold may be provided to manufacture the more intricate, dimensionally-demanding components 30 and 32. In contrast to conventional thought, there can be less expense in using multiple molds to make the integrated facepiece insert than there can be in making one complex mold for the whole facepiece insert. The method of the present invention therefore can be economically beneficial over the heretofore known technique of using a single mold to make the insert.

As indicated, the fluid communication components typically are critical tolerance components that typically have a tolerance of 0.15 mm or less, desirably 0.1 or less, and more desirably 0.05 or less. In contrast, the supporting portion of the facepiece insert conventionally has a tolerance requirement of about 0.16 to 0.3 mm, preferably about 0.2 mm. Because the tolerance requirements of the fluid communication component(s) are more critical than those of the supporting portion of the facepiece insert, they tend to dictate facepiece insert production as a whole. When the critical tolerance component can be manufactured using simple robust tooling at a separate location, the whole insert can then be joined together rapidly, without the need for the trained technical resources that are needed for manufacturing the critical tolerance component.

A mask body of the present invention can be manufactured by separately providing fluid communication component(s) and a supporting portion of an insert and securing the fluid communication component(s) to the supporting portion of the insert to form a facepiece insert. The supporting portion of the facepiece insert and the fluid communication component(s) may be separately fashioned using, for example, injection molding. After each of these parts have been made, they can be joined together through mechanical means, chemical means, adhesive bonding, welding, fusing, and the like. Preferably after the facepiece insert has been assembled, a mask body can be created by securing a compliant face-contacting member to the facepiece insert.

The face-contacting member can be made by injection molding, using a cavity that is adapted to the desired shape of the compliant member and that is adapted to accommodate the facepiece insert. The insert is positioned in the mold such that when the thermoplastic material is injected into the mold, the thermoplastic material bonds directly to the facepiece insert to form a seal around it to mechanically or chemically secure the compliant member to the facepiece insert. The dimples 36 on insert 16 may assist in securing the compliant portion 14 (FIG. 1) to the insert 16 during the molding process by providing spacing to center the insert during the molding operation. The mold configuration, and the insert positioning within the mold, permits the thermoplastic material to completely surround the peripheral edge of the facepiece insert. The insert and the compliant portion materials can be selected so that a chemical bond is formed between the facepiece insert and the compliant face-contacting member. Examples of materials that could be used for making the insert, preferably in a homogeneous form, may include materials that have characteristics similar to polypropylene. The insert also could be made of a composite of two or more materials. The characteristics that are needed for the insert include compatible shrinkage (affects finished size after molding) and compatibility with the facepiece elastomer. Materials that may be suitable include semi-crystalline thermoplastic resins such as nylon, polyester, and polyethylene. If a composite is desired, the fluid communication components can be produced from nearly any rigid material and then overmolded in the second step using compatible materials such as those described herein. Other fluid communication component materials may include: metal such as aluminum or stainless steel or thermoplastics such as nylon or polypropylene reinforced with filler. Examples of materials that could be used for the compliant member include those compatible with the face piece insert and perhaps with an injection-molding process. These materials include a variety of grades that fall into a category known as ThermoPlastic Elastomers (TPE's), for example, as Kraton™, Teknor Apex-Qst Monprene™, and Exxon Mobil-AES Santoprene™. See U.S. Pat. No. 5,062,421 to Burns and Reischel for additional details on providing a rigid insert and a compliant face contacting member.

The following Example has been selected merely to further illustrate features, advantages, and other details of the invention. It is to be expressly understood, however, that while the Example serves this purpose, the particular ingredients and the amounts used, as well as other conditions and details, are not to be construed in a manner that would unduly limit the scope of this invention.

EXAMPLE

A molded insert resembling the insert shown in FIGS. 2 and 3 was produced using a two-stage injection molding process in which a fluid communication component was over molded with a supporting portion. The fluid communication component, which required dimensional tolerances on the order of 0.1 mm or smaller, was designed to function as a fluidic coupling point for a respirator face piece. The supporting portion, which had dimensional tolerances on the order of 0.2 mm, functioned both as a structural component and interface between the fluid communication component and an elastomeric compliant face-contacting member. The fluid communication component was fabricated using a water-cooled mold that was mounted to a 100 ton horizontal reciprocating screw thermoplastic injection-molding machine. Polypropylene resin (Himont Pro Fax PDS 701 from Himont USA, Inc., Wilmington, Del.) was used to make the fluid communication component. Operating conditions and process times for the mold and press are given below in Tables 1 and 2. The fluid communication component was approximately 0.6 mm thick, and had a diameter of about 3.4 centimeters (cm).

After formation, cooling, and stabilization of the fluid communication component, two of these parts were inserted into a second injection molding system to create a rigid insert. The second injection molding system used a water-cooled mold mounted to a 100 ton vertical reciprocating screw thermoplastic injection-molding machine. The mold on the second injection molding system held the inserted parts in the proper registration while a molten resin filled the mold cavity, fusing the two parts non-integrally to the thence created supporting portion. The resin used to form the supporting portion was the same as that used to form the fluid communication component. Operating conditions and process times for the second molding step are also set forth in Tables 1 and 2. The supporting portion had a thickness of about 1.75 mm at the point where it joined the fluid communication component and gradually tapered to about 0.6 mm at its outer edge.

The completed mask body, to which components such as valve flappers, cartridges, and head straps can be attached to create a respirator, was formed in a third and final injection-molding step. In this injection-molding step, the rigid insert was over molded with an elastomeric face-sealing component. The third injection molding system was a water-cooled mold that was mounted to a 300 ton horizontal reciprocating screw thermoplastic injection-molding machine. The mold held the inserted part in the proper registration while molten resin filled the mold cavity, forming the mask body as the insert was fused to the compliant face-contacting member. The resin used to form the compliant face-contacting member was an oil-modified styrene-ethylene/butylene-styrene block copolymer, Kraton™ G 2705Z, from Kraton™ WWW, Kraton Polymers, Houston, Tex., which contained a light gray carbon-based pigment. Operating conditions and process times for the final molding step are shown below in Tables 1 and 2. The elastomeric face-contacting had a nominal thickness of about 0.8 mm.

TABLE 1

EXTRUDER/INJECTOR CONDITIONS

|  | Fluid Communication Component | Facepiece Insert | Mask Body |
|---|---|---|---|
| Heater Settings (° C.) | | | |
| Front Zone | 250 | 250 | 182 |
| Center Zone | 225 | 230 | 188 |
| Rear Zone | 200 | 200 | 193 |
| Screw Speed (rpm) | 50 | 50 | 40 |
| Injector Speed (cm/sec) | 20 | 20 | 12 |
| Boost Pressure (bar) | 11,000 | 10,000 | 9425 |
| Boost Time (sec) | 0.5 | 0.6 | 1.25 |
| Hold Pressure (bar) | 12,000 | 10,000 | 2900 |
| Hold Time (sec) | 0.2 | 0.3 | 6.0 |
| Back Pressure (bar) | 3,000 | 3,000 | 2175 |

TABLE 2

MOLDING CONDITIONS

|  | Fluid Communication Component | Facepiece Insert | Mask Body |
|---|---|---|---|
| Mold Close Time (sec) | 17 | 20 | 10 |
| Mold Open Time (see) | 3 | 10 | 1 |
| Cycle Time (sec) | 20 | 30 | 56 |
| Mold Temperature (° C.) | 20 | 20 | 25 |

This invention may take on various modifications and alterations without departing from the spirit and scope thereof. Accordingly, it is to be understood that this invention is not to be limited to the above-described, but it is to be controlled by the limitations set forth in the following claims and any equivalents thereof.

It is also to be understood that this invention may be suitably practiced in the absence of any element not specifically disclosed herein.

All patents and patent applications cited above, including those in the background section, are incorporated by reference into this document in total.

What is claimed is:

1. A method of making a facepiece insert that has at least one fluid communication component, which method comprises:
    (a) providing at least one supporting portion of a facepiece insert;
    (b) providing at least one fluid communication component separately from the supporting portion of the facepiece insert; and
    (c) securing the at least one fluid communication component to the at least one supporting portion.

2. A method of making a respiratory mask body, which method comprises the steps of claim 1 and further comprises:
    (d) securing a compliant face-contacting member to the facepiece insert.

3. A method of making a respiratory mask, which method comprises the steps of claim 2 and further comprises:
    (e) securing a harness to the mask body.

4. The method of claim 3, further comprising providing at least one filter cartridge that is capable of being attached to the at least one fluid communication component.

5. The method of claim 3, wherein the at least one fluid communication component is a critical tolerance component.

6. The method of claim 2, wherein the at least one fluid communication component is a critical tolerance component.

7. The method of claim 1, wherein the at least one fluid communication component is a critical tolerance component.

8. The method of claim 1, wherein the at least one supporting portion of the facepiece insert and the at least one fluid communication component are made from similar polymeric materials and are fused together.

9. The method of claim 1, wherein the at least one fluid communication component has a tolerance of less than 0.15 millimeters.

10. The method of claim 1, wherein the at least one fluid communication component has a tolerance of less than 0.1 millimeters.

11. The method of claim 1, wherein the at least one fluid communication component has a tolerance of less than 0.05 millimeters.

12. The method of claim 1, wherein the supporting portion of the facepiece insert has a tolerance of about 0.16 mm to 0.3 mm.

13. The method of claim 1, wherein the fluid communication component includes a means for allowing a filter cartridge to be attached thereto.

14. A facepiece insert that comprises:
    (a) a supporting portion; and
    (b) a fluid communication component that is non-integrally joined to the supporting portion.

15. A respiratory mask body that comprises the facepiece insert of claim 14, and further comprises a compliant face contacting member that is non-integrally joined to the supporting portion of the facepiece insert.

16. The respiratory mask body of claim 15, wherein the fluid communication component has a tolerance of 0.15 mm or less, and wherein the supporting portion has a tolerance of about 0.16 mm or greater.

17. A respiratory mask, that comprises the mask body of claim 15, and further includes a harness for supporting the mask body over a person's nose and mouth.

18. The respiratory mask of claim 17, wherein the fluid communication component comprises part of an inhalation valve.

19. The respiratory mask of claim 17, wherein the fluid communication component comprises part of an exhalation valve.

20. A respiratory mask of claim 17, wherein the fluid communication component has a tolerance of 0.15 mm or less, and wherein the supporting portion has a tolerance of about 0.16 to 0.3 mm.

21. The respiratory mask of claim 17, wherein the supporting portion and the fluid communication component are fused together.

22. A respiratory mask, that comprises the mask body of claim 15, and further includes a filter cartridge for supporting the mask body over a person's nose and mouth.

23. The method of claim 14, wherein the fluid communication component includes a means for allowing a filter cartridge to be attached thereto.

24. A respiratory mask that comprises:
(A) a mask body that includes:
  (1) a facepiece insert that includes:
    (a) a supporting portion;
    (b) at least one fluid communication component that is non-integrally joined to the supporting portion and that is a critical tolerance component; and
  (2) a compliant face-contacting member that is non-integrally joined to the supporting portion of the facepiece insert; and
(B) a harness for supporting the mask body at least over a person's nose and mouth.

25. The respiratory mask of claim 24, further comprising at least one filter cartridge that is secured to the mask body at a location where the fluid communication component resides.

26. The method of claim 24, wherein the fluid communication component includes a means for allowing a filter cartridge to be attached thereto.

* * * * *